United States Patent [19]

Sypula

[11] 4,009,334
[45] Feb. 22, 1977

[54] VIDEO NOISE REDUCTION CIRCUIT

[75] Inventor: Richard Joseph Sypula, Rochester, N.Y.

[73] Assignee: Eastman Kodak Company, Rochester, N.Y.

[22] Filed: Mar. 17, 1976

[21] Appl. No.: 667,739

[52] U.S. Cl. .................... 358/167; 178/DIG. 12; 358/36

[51] Int. Cl.² .......................................... H04N 5/21

[58] Field of Search ..... 178/6, 6.8, 7.3 R, DIG. 12; 358/36

[56] References Cited

UNITED STATES PATENTS

| | | | |
|---|---|---|---|
| 3,333,055 | 7/1967 | Krause | 178/6 |
| 3,602,737 | 8/1971 | Radecke | 178/DIG. 12 |
| 3,715,477 | 2/1973 | Olson | 358/36 |

*Primary Examiner*—Howard W. Britton
*Attorney, Agent, or Firm*—T. H. Close

[57] ABSTRACT

In a method and apparatus for reducing noise in a video signal, the low-frequency component is extracted from the video signal by filtering; the low-frequency component is then subtracted from the video signal to yield a high-frequency component; the high-frequency component is cored to remove the low-amplitude portions therefrom; and the cored high-frequency component is combined with the low-frequency component to produce a video signal having reduced noise.

11 Claims, 15 Drawing Figures

VIDEO NOISE REDUCTION CIRCUIT

BACKGROUND OF THE INVENTION

1. Field of the Invention

This invention relates to a method and apparatus for reducing noise disturbance in wide-band electrical signals. More particularly, this invention relates to a method and circuit arrangement for reducing unwanted noise in a television video signal using a process known as coring.

2. Description of the Prior Art

Television video signals are frequently subject to having unwanted noise superimposed on them. One kind of unwanted noise, called textural noise, is caused by granularity in the devices that generate or store the video information. Examples of textural noise sources include: vidicon target irregularities, grain in the film used in tele-scene apparatus, magnetic tape irregularities, and flying spot scanner phosphor granularity patterns. Another kind of unwanted noise is scintillation noise including electronic thermal and shot noise.

A television video signal contains picture information over a broad band of frequencies. The large area brightness level information is contained in the low-frequency component of the signal, while the detail or sharp edge information is contained in the higher frequency component of the video signal. Textural and scintillation noise both possess a low-amplitude high-frequency characteristic when compared to the picture information. Therefore it is possible to improve the signal-to-noise ratio of a video signal by removing or suppressing the high-frequency low-amplitude portions of the signal. This is accomplished, of course, at the expense of the low-amplitude high-frequency portion of the picture information, which as a general rule can desirably be traded off for a reduction in noise. The removal of the low-amplitude excursion from the high-frequency portion of a signal is known in the television art as coring.

Known prior art systems for reducing unwanted noise in video signals by coring employ high pass filters to extract the high-frequency component from the video signal. One such device disclosed in U.S. Pat. No. 3,333,055 issued July 25, 1967, to Krause employs band pass filters to separate a television signal into low-frequency and high-frequency components. The high-frequency component of the signal is passed through a threshold device to inhibit any signal below a predetermined threshold value. The output of the threshold device is then combined with the low-frequency components of the television signal to provide a television signal with reduced noise.

Another approach to noise reduction in a video signal also employs a high pass filter to extract the high-frequency component of the signal. See U.S. Pat. No. 3,602,737, issued Aug. 31, 1971, to Radecke. In the device disclosed by Radecke, the high-frequency component of the signal is separated into parts above and below a given amplitude, and the low-amplitude portion of the high-frequency component of the signal is subtracted from the wide band signal to yield a noise suppressed wide band signal. The high-amplitude portion of the high-frequency component of the signal is added to the noise-suppressed wide band signal to partially compensate for the low-amplitude detail that was lost in the noise suppression step. A common feature of these known prior art systems for reducing noise in a video signal is their use of band pass filters to directly extract the high-frequency component of the signal prior to coring. It is a well known phenomenon of band pass filters that they undesirably disturb the phase relationships in signals that are passed through them. This phase distortion is particularly undesirable in the high-frequency component of a video signal.

One known device which confronts the problem of phase distortion in the high-frequency portion of the video signal is shown in U.S. Pat. No. 3,715,477 issued to Olson et al, on Feb. 6, 1973. The Olson patent discloses a video-signal noise-limiting apparatus wherein a video signal is separated into high and low frequency components by a comb filter having the advantage of a linear phase delay. The high-frequency component is cored to remove low-amplitude excursions therefrom and the cored high-frequency signal component is combined with the low-frequency component in suitable proportions to produce a video signal having an improved signal-to-noise ratio.

One disadvantage to the use of a comb filter to separate the video signal into high and low frequency components is the difficulty of achieving a relatively clean separation between the high and low frequency components of the signal. Another disadvantage is that, due to the nature of the comb filter, the high-low frequency separation occurs near the mid-frequency of the wide band signal, which is not the most desirable separation point for applications such as the removal of the effects of film grain from a video signal.

SUMMARY OF THE INVENTION

According to the present invention a method and apparatus are provided for removing unwanted noise from a broad band signal such as a video signal.

More particularly, one embodiment of the method of the present invention provides for applying the video signal to a low pass linear phase delay filter to extract the low-frequency component of the video signal. The unfiltered video signal is also applied to a linear phase delay device to obtain a broad band signal in phase with the low-frequency component of the video signal. The low-frequency component is subtracted from the broad band signal to yield a high-frequency component with minimal phase distortion and a relatively clean separation between the high-frequency component and the low-frequency component. The high-frequency component is cored, and then added to the low-frequency component of the video signal to produce the noise reduced video signal.

In one embodiment of the apparatus of the present invention, a circuit is provided having: a low pass filter network for extracting the low-frequency component of a video signal; a delay for providing the broad band video signal in phase with the low-frequency component of the video signal; a video differential amplifier for subtracting the low-frequency component from the broad band video signal to yield difference signals corresponding to a normal and an inverted high-frequency component of the video signal; a coring circuit for coring, summing, and amplifying the normal and inverted difference signals to produce a cored high-frequency component of the video signal; and a summer for combining the cored signal with the low-frequency component of the video signal. In a preferred embodiment, the coring circuit has a transfer characteristic that preserves the gamma of the original video signal in the noise reduced signal.

The invention, and its features and advantages, will be set forth and become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENTS

Figure 1:
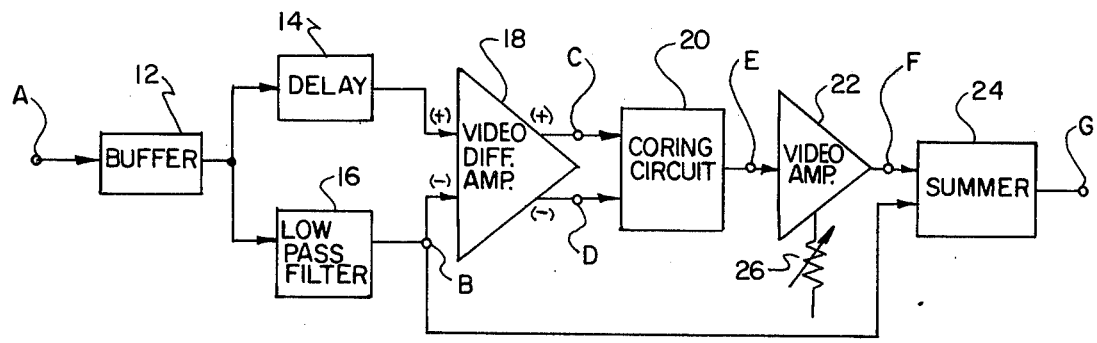
FIG. 1 is a block diagram of the basic element of a video noise reduction circuit according to the present invention.

FIG. 1 shows a block diagram of a circuit for removing unwanted noise from the video signal of a black and white TV system or from the luminance component of a composite color TV signal. In FIG. 1 the video signal containing the unwanted noise is applied to an input buffer 12 via input terminal A. Buffer 12 provides current gain to the video signal and supplies the signal with low output impedance to a delay device 14 and to a low pass filter 16. The low pass filter extracts the low-frequency component of the video signal, which appears at point B. The cutoff frequency of the low pass filter is chosen so that the unwanted high-frequency noise component of the video signal is not passed. For the removal of the affects of film grain from a video signal, it has been found that a cutoff frequency equal to approximately 1/5 of the luminance upper frequency works very well. The delay device 14 is provided to delay the unfiltered video signal by the same amount that the low pass filter delays the low-frequency component of the video signal. The delayed video signal and the low-frequency component of the video signal are applied to the plus and minus inputs respectively of a video differential amplifier 18 in which the low-frequency component is subtracted from the video signal to yield a high-frequency component of the video signal containing the high-frequency noise and picture detail information. Amplifier 18 has a normal (+) output and an inverted (−) output.

The normal and inverted high-frequency component signals appear at points C and D respectively and are fed to a coring circuit 20 wherein the low-amplitude portion of the high-frequency component is removed. The low-amplitude portion of the high-frequency component is mostly noise, but some low-amplitude picture detail is lost in the coring process. The cored high-frequency component of the video signal appears at the output E of the coring circuit and is amplified by an amplifier 22 having an adjustable gain, controlled by variable resistor 26. The cored and amplified high-frequency component appears at point F and is applied to a summing circuit 24 along with the low-frequency component of the video signal. The summing circuit 24 combines the low-frequency component and the cored high-frequency component to produce a video signal at point G having substantially reduced noise.

The details of the coring circuit 20 will now be discussed with reference to FIG. 2 wherein similar letter designations are used for circuit points corresponding to the circuit points in FIG. 1. The normal and inverted high-frequency components of the video signal enter the coring circuit 20 via input points C and D respectively. The normal and inverted signals are applied respectively to buffers 38 and 40 that provide current gain to the signals and apply the signals respectively to the anodes of fast reverse-recovery diodes 42 and 44. A voltage source 50 is connected to the cathodes of diodes 42 and 44 through resistors 46 and 48 respectively. The voltage output of voltage source 50 is adjustable via variable resistor 51.

Diodes 42 and 44 rectify the normal and inverted high-frequency components of the video signal respectively and voltage source 50 biases the cathodes of the diodes to a predetermined voltage. Thus only those portions of the rectified signals having amplitudes greater than the bias voltage plus the diode drop of diode 42 or 44 will be transmitted through the diodes. The cathode of diode 44 is connected to the input of an inverter 52 that inverts the signal appearing at the cathode of diode 44. The output of inverter 52 and the cathode of diode 42 are connected to the input of a summing circuit 54. The cored high-frequency component of the video signal is produced at the output E of the summing circuit.

The manner in which the noise reduction circuit operates will now be explained in more detail with reference to FIGS. 3A–G which graphically illustrate the effects of the circuit on a representative video signal at correspondingly lettered points in the circuit of FIG. 1.

Figure 3A:
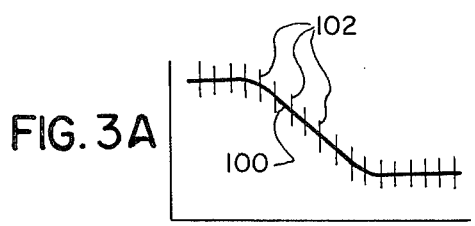
FIG. 3A–G are wave form diagrams showing the changes experienced by a typical video signal at correspondingly lettered points as it passes through the circuit of FIG. 1.

In FIG. 3A a portion of a video signal is shown representing a transition from a light to a dark area of a picture. The broad band picture information is represented by the heavy solid line 100. Superimposed on the broad band picture information is a high-frequency noise signal 102 caused, for example, by film grain. The low pass filter 16 (FIG. 1) extracts the low-frequency portion of the broad band video signal shown as solid line 104 in FIG. 3B. It can be seen from FIG. 3B that the transition from light to dark represented by solid line 104 is not as rapid as the transition shown by line 100 in FIG. 3A, thereby indicating that high-frequency detail information is absent in the low-frequency component of the signal. However, the high-frequency noise that was present in the video signal in FIG. 3A has also been removed from the low-frequency component shown in FIG. 3B.

Figure 2:
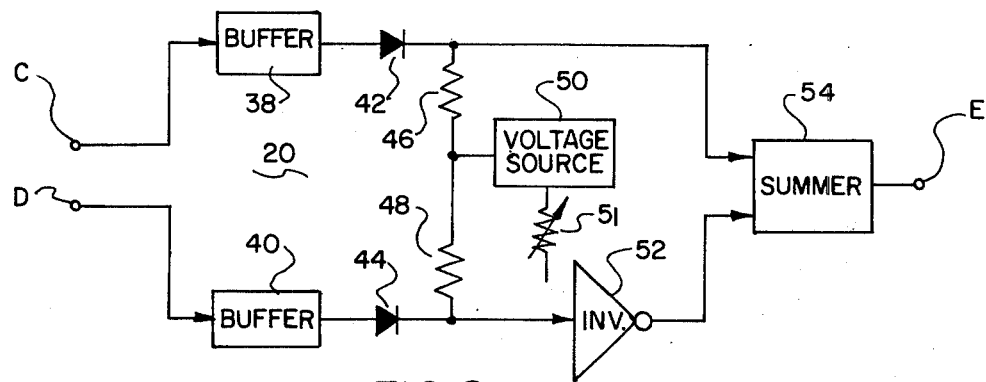
FIG. 2 is a block diagram of one form of coring circuit useful in the circuit of FIG. 1.
Figure 3B:
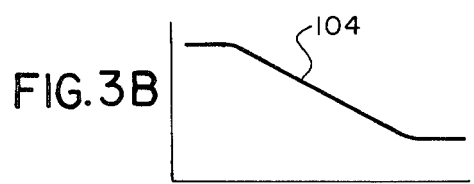
Figure 3C:
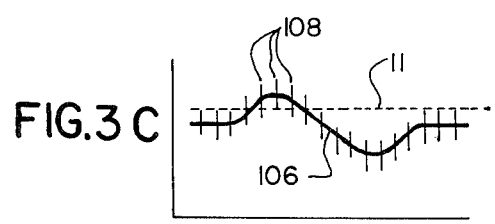

FIG. 3C shows the normal (+) output of the video differential amplifier 18 (FIG. 1), which output is the high-frequency component of the video signal. The high-frequency picture information is designated 106 and the high-frequency noise superimposed on the picture information is designated 108. A dashed line 11 represents the biasing level of diode 42 provided by voltage source 50 (FIG. 2). Only that portion of the high-frequency signal above the dotted line 11 will be transmitted to the summing circuit 54 (FIG. 2). The height of line 11 is selected via adjustable resistor 51, which is the coring level adjustment and is selected so that the unwanted noise 108 on the unchanging portion of the picture information 106 fall under the dotted line 11.

Figure 3D:
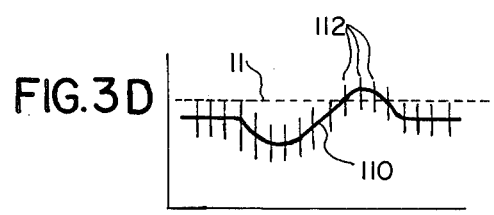

Similarly, FIG. 3D shows the inverted (−) output of the video amplifier 18 (FIG. 1) with the inverted high-frequency picture information designated 110 and the high-frequency noise designated 112. Dashed line 11 represents the biasing level of diode 44 provided by voltage source 50 (FIG. 2) and only that portion of the signal above dotted line 11 is transmitted to the inverter 52 (FIG. 2).

Figure 3E:
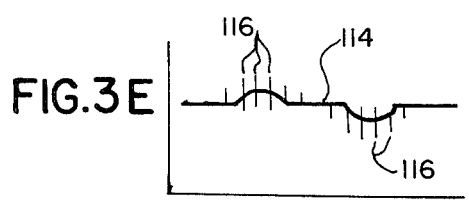

FIG. 3E shows the output of the summing circuit 54 (FIG. 2) which has added the portion of the signal above line 11 in FIG. 3C to the inverted portion of the signal above line 11 in FIG. 3D. The output of the summing circuit 54 is the cored high-frequency component of the video signal. The high-frequency picture information is designated 114 in FIG. 3E and the remnants of unwanted noise superimposed on the high-frequency information are designated 116.

The cored high-frequency component of the video signal is amplified by amplifier 22 (FIG. 1) to restore the amplitude of the high-frequency component removed by the coring circuit. The amplitude of the cored high-frequency component is adjustable via variable resistor 26 (FIG. 1).

Figure 3F:
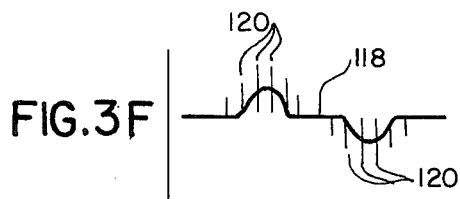

FIG. 3F shows the amplitude restored, cored, high-frequency component of the video signal. The high-frequency picture information is designated 118 and the remnants of noise superimposed on the high-frequency information is designated 120.

Figure 3G:
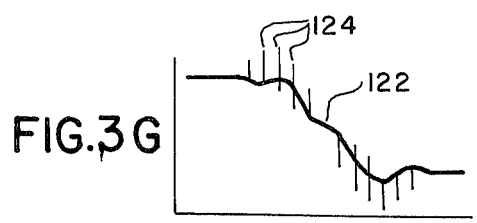

FIG. 3G shows the output of the noise reduction circuit after the cored high-frequency component shown in FIG. 3F has been added to the low-frequency component shown in FIG. 3B by summing circuit 24 (FIG. 1). The broad band picture information is designated 122 and the remnants of unwanted noise 124. It will be observed when comparing the output shown in FIG. 3G with the input shown in FIG. 3A, that the high-frequency picture information in the area of the transition has been somewhat distorted and that some noise still remains in the transition area. However, the noise outside the transition area has been eliminated and this is a very desirable trade-off when removing the effects of film grain and scintillation noise from a video signal.

Figure 4:
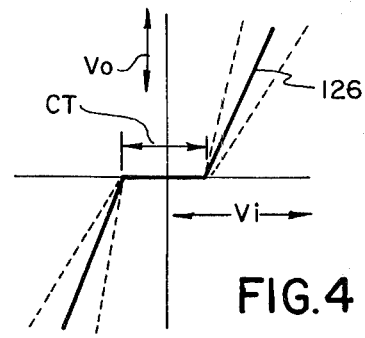
FIG. 4 is a graph illustrating the transfer function of the coring circuit of FIG. 2.

FIG. 4 shows the transfer function of the coring circuit of FIG. 2, indicated by solid line 126. The width of the coring threshold, designated CT, is adjusted via variable resistor 51 (FIG. 2) associated with voltage source 50. The slope of curve 126 outside the coring threshold can be adjusted within the boundaries indicated by the dotted lines via gain control resistor 26 (FIG. 1) associated with amplifier 22.

If the gamma of the coring circuit is defined as the ratio of the log of the output voltage $V_o$ over the log of the input voltage $V_i$, it can be seen from FIG. 4 that gamma of the coring circuit of FIG. 2 is not a constant but varies for each point outside of the coring threshold. This change in gamma is due to the fact that if the portions of curve 126 outside the coring threshold are extended, they do not pass through the origin. As a result, the contrast of the original picture detail information will not be preserved when the video signal is passed through the coring circuit. To preserve the transfer of low contract detail, the gain of amplifier 22 (FIG. 1) can be increased, however, this unnaturally distorts the contrast of any high contrast detail in the picture.

Figure 5:
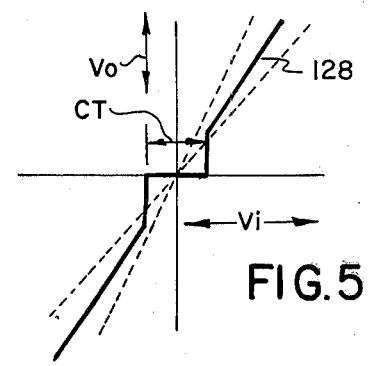
FIG. 5 is a graph illustrating another desirable transfer function for a coring circuit.

A coring circuit having the transfer functions shown in FIG. 5 would exhibit a constant gamma and therefore would preserve the contrast of the original picture information since the extensions of the curve 128 representing the transfer function outside of the coring threshold CT pass through the origin. A block diagram of such a circuit having the transfer function shown in FIG. 5 is shown in FIG. 6.

Figure 6:
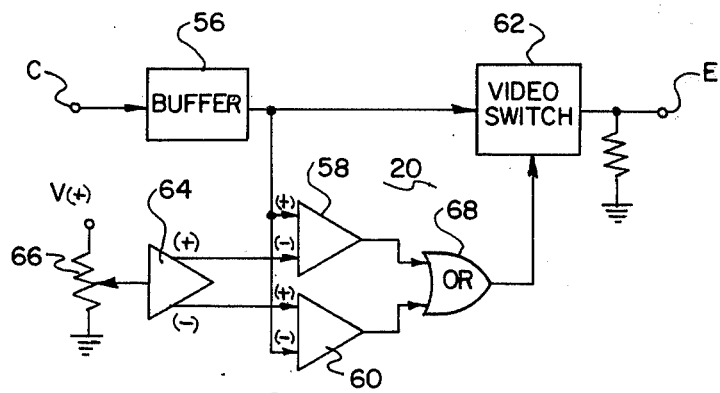
FIG. 6 is a block diagram of a coring circuit having the transfer function of FIG. 5.

In the constant-gamma coring circuit shown in FIG. 6, only the normal (+) output of the video differential amplifier 18 (FIG. 1) is used. The high-frequency component of the video signal enters the coring circuit at point C where it is fed to a buffer 56 that provides current gain to the signal. The output of the buffer 56 is connected to the positive and negative terminals respectively of comparators 58 and 60 and to the input of a video switch 62. The negative and positive terminals respectively of comparators 58 and 60 are supplied with positive and negative reference voltages respectively from a unity gain amplifier 64. The output voltage levels of amplifier 64 are determined by a potentiometer 66 connected between a voltage source V+ and ground and having a center tap connected to the input of the amplifier 64. The outputs of the comparators 58 and 60 are connected to the inputs of an OR gate 68. The output of the OR gate is connected to the switching input of a video switch 62.

The coring circuit of FIG. 6 functions in the following manner. Video switch 62 is normally open and does not pass the high-frequency component of the video signal to point E. Switch 62 closes to pass the high-frequency portion of the video signal in response to a signal being applied to its switching input from the output of OR gate 68. A signal appears at the output of OR gate 68 whenever a signal is applied to either of its inputs from comparators 58 or 60. Comparator 58 produces an output signal when the voltage of the high-frequency component of the video signal supplied to its positive (+) input exceeds the positive threshold voltage supplied to its negative (−) input by amplifier 64. Similarly, comparator 60 produces an output signal in response to the voltage of the high-frequency component of the video signal supplied to its negative (−) input falling below the negative threshold voltage supplied to its positive (+) input by amplifier 64. Thus, whenever the voltage of the high-frequency component of the video signal rises above or falls below the threshold voltages established by amplifier 64, video switch 62 will close to pass the high-frequency component of the video signal.

Figure 6E:
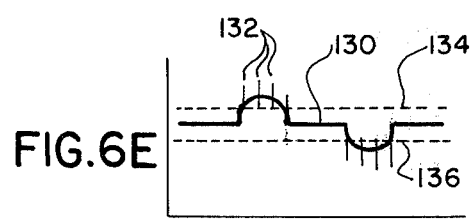
FIG. 6E and G are wave form diagrams showing the changes experienced by a typical video signal acted upon by the coring circuit of FIG. 6.

The output of the coring circuit of FIG. 6 is shown in FIG. 6E. The high-frequency picture information is designated 130 and the high-frequency noise superimposed thereon is designated 132. The coring threshold is represented by dotted lines 134 and 136. In FIG. 5, the coring threshold is indicated as CT and is selected by the adjustment of potentiometer 66 (FIG. 6). The slope of the transfer function 128 is variable within the dotted lines shown in FIG. 5 by adjusting resistor 26 (FIG. 1).

Figure 6G:
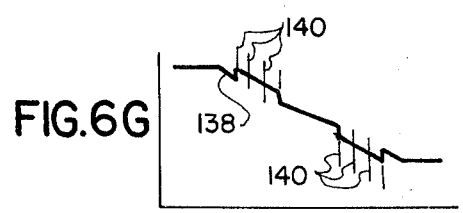

When the coring circuit shown in FIG. 6 is employed in the noise reduction circuit of FIG. 1, the output at point G will appear as shown in FIG. 6G. It will be noted that the high-frequency picture information 138 in the area of the transition has been somewhat distorted, and that remnants of noise 140 remain on the high-frequency picture information in the area of the transition.

Figure 7:
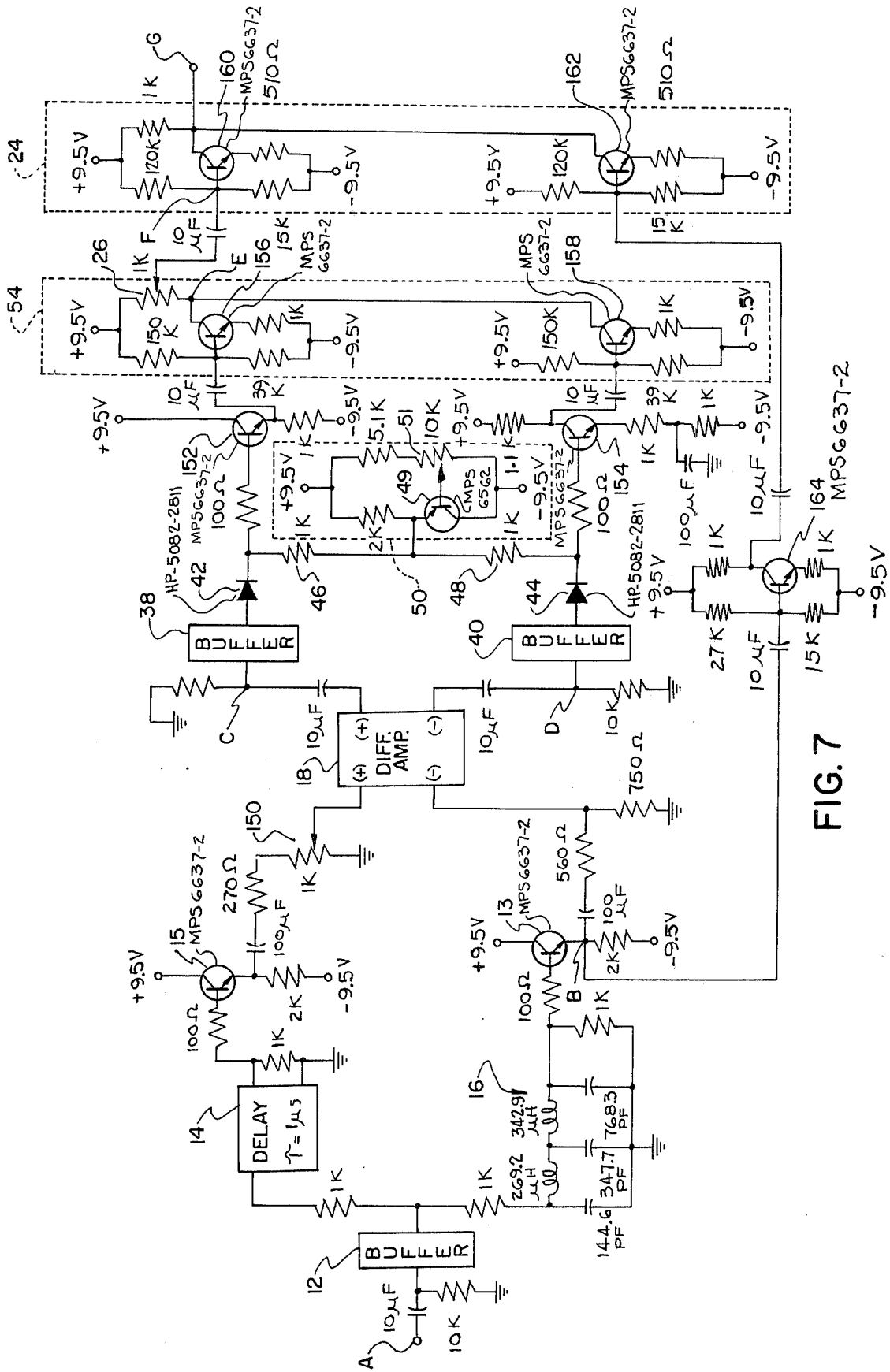
FIG. 7 is a schematic circuit diagram of the noise reduction circuit of FIG. 1.

FIG. 7 shows a schematic circuit diagram of a practical example of the noise limiting circuit shown in FIG. 1 incorporating the coring circuit shown in FIG. 2. The circuit has been designed to eliminate noise caused by film grain in a super 8 telecine apparatus. Circuit elements and circuit points corresponding to the circuit elements and points in FIGS. 1 and 2 have been correspondingly numbered and lettered.

The video signal present at point A is applied through a capacitor to input buffer 12. Buffers 12, 38, and 40 are manufactured by National Semiconductor Corp., Part No. LH0002. The video signal present at the output of buffer 12 is impressed through a resistor on a delay line 14 and through another resistor on a low pass filter 16. The delay line 14 is manufactured by the Sony Corp., Part No. 1-415-049-11, and has a delay of 1 microsecond (1 µs). The low pass filter 16 is a transitional filter (Gaussian to 6DB), n=5, with a frequency cut-off of 500 KHz and a delay of 1 microsecond (1 µs). The frequency cut-off was chosen to be approximately equal to 1/5 of the luminance upper frequency limit in the telecine apparatus.

The low-frequency component is extracted from the video signal by low pass filter 16 and is applied to the base of transistor 13 which is arranged in an emitter follower configuration for isolation purposes. All transitors in the circuit shown in FIG. 77 are manufactured by Motorola with part numbers indicated on the drawing. The low-frequency component appears at point B.

The delayed video signal emerging from delay line 14 is applied to the base of transistor 15 which is arranged in an emitter follower configuration for isolation purposes. The delayed video signal emerging from the emitter of transistor 15 is impressed upon the positive (+) input of differential amplifier 18 through a signal balancing potentiometer 150. The low-frequency component of the video signal is supplied to the negative (−) input of differential amplifier 18. Differential amplifier 18 is manufactured by RCA, Part No. CA3001. Differential amplifier 18 subtracts the low-frequency component from the broad band video signal to produce a normal and an inverted high-frequency component appearing respectively at points C and D. After being buffered by buffers 38 and 40, the normal and inverted high-frequency components respectively are applied to the anodes of fast reverse recovery diodes 42 and 44. The diodes are manufactured by Hewlitt-Packard—the part numbers are indicated on the drawing.

Adjustable voltage source 50 includes a transistor 49 arranged in an emitter follower configuration. The output of voltage source 50 is connected to the cathodes of diodes 42 and 44 through resistors 46 and 48 respectively to establish the coring level of the coring portion of the circuit. The output voltage of voltage source 50 and hence the coring level are changed by adjusting variable resistor 51.

The rectified and cored normal high-frequency component of the video signal appearing at the cathode of diode 42 is fed through a resistor to the base of transistor 152 which is arranged in an emitter follower configuration for isolation purposes. The emitter of transistor 152 is connected through a capacitor to the base of transistor 156 which comprises one-half of summing circuit 54.

The rectified and cored inverted the component of the video signal appearing at the cathode of diode 44 is fed through a resistor to the base of transistor 154 which is connected in a common emitter configuration to invert the signal and to provide isolation. The collector of transistor 154 is connected through a capacitor to the base of transistor 158 which comprises the remaining half of summing circuit 54. The collector of transistor 158 is connected to he collector of transistor 156 to sum the two parts of the high-frequency component by adding the collector currents. The cored high-frequency component of the video signal is present at point E in the circuit.

Potentiometer 26, connected to the collectors of transistors 156 and 158, controls the gain of the cored high-frequency component of the video signal available at the center tap of potentiometer 26. The cored high-frequency component and the low-frequency component of the video signal are recombined in summing circuit 24 which includes transistors 160 and 162. The center tap of potentiometer 26 is connected through a capacitor to the base of transistor 160 and the low-frequency component of the video signal taken from point B in the circuit is connected to the base of transistor 164, which is arranged in a common emitter configuration to invert the signal and to provide isolation. The collector of transistor 164 is connected through a capacitor to the base of transistor 162. The collector of transistor 162 is connected to the collector of transistor 160 whereby the signal components are summed together by adding collector currents. The cored video signal appears at output point G connected to the collectors of transistors 160 and 162.

The invention has been disclosed as operating on the video signal of a black and white TV system or on the luminance component of a composite color TV signal, however, it is to be understood that this invention is not necessarily so limited. For example, the video noise reduction circuit of this invention could be used on one or more of the plurality of color signals in a color TV system. It will also be understood that variations and modifications can be effected within the spirit and scope of the invention.

I claim:
1. A method of reducing the noise in a video signal comprising the steps of:
   a. extracting a relatively low-frequency component from the video signal;
   b. subtracting said relatively low-frequency component from the video signal to yield a relatively high-frequency component;
   c. removing relatively low-amplitude portions from said relatively high-frequency component to yield a cored high-frequency component; and
   d. combining said relatively low-frequency component with said cored high-frequency component to produce a noise reduced video signal.

2. The method of claim 1 further comprising the step of delaying the video signal prior to subtracting said relatively low-frequency component.

3. The method of claim 1 further comprising the step of amplifying said cored high-frequency component prior to combining said relatively low-frequency component with said cored high-frequency component.

4. The method of claim 1 wherein the frequency cutoff for said relatively low-frequency component is approximately one-fifth of the upper frequency limit of the video signal.

5. Apparatus for reducing the noise in a video signal comprising:
   a. means for extracting a relatively low-frequency component from the video signal;
   b. means for subtracting said relatively low-frequency component from the video signal to yield a relatively high-frequency component;
   c. means for removing relatively low-amplitude portions from said relatively high-frequency component to yield a cored high-frequency component; and
   d. means for combining said relatively low-frequency component with said cored high-frequency component to produce a noise reduced video signal.

6. The apparatus as claimed in claim 5 further comprising means for delaying the video signal prior to delivering the video signal to said subtracting means.

7. The apparatus as claimed in claim 6 wherein said extracting means comprises a low pass filter having a characteristic delay and wherein the time delay of said delaying means is equal to the characteristic delay of said low pass filter.

8. The apparatus as claimed in claim 5 wherein said relatively low-frequency component includes all frequencies up to approximately one-fifth of the upper frequency limit of the video signal.

9. The apparatus of claim 5 wherein said subtracting means comprises a differential amplifier having a positive input adapted to receive the video signal, a negative input adapted to receive said relatively low-frequency component, and an output adapted to deliver said relatively high-frequency component.

10. The apparatus of claim 9 wherein said differential amplifier further includes a negative output adapted to deliver an inverted relatively high-frequency component, and wherein said removing means further comprises:
   a. a source of voltage;
   b. a first diode having an anode adapted to receive said relatively high-frequency component and a cathode connected to said source of voltage;
   c. a second diode having an anode adapted to receive said inverted relatively high-frequency component and a cathode connected to said source of voltage;
   d. means for inverting the signal appearing at the cathode of said second diode said inverting means having an input connected to the cathode of said second diode and an output; and
   e. means connected to the cathode of said first diode and the output of said inverting means for summing the signal appearing at the cathode of said first diode and the signal appearing on the output of said inverting means to produce said cored high-frequency component.

11. The apparatus of claim 9 wherein said removing means further comprises;
   a. means for switching said relatively high-frequency component in response to a switching signal, said switching means having a signal input for receiving said relatively high-frequency component, a switching input for receiving the switching signal, and an output for delivering said cored high-frequency component;
   b. means for generating reference voltages, said reference voltage generating means having a positive output for delivering a positive reference voltage and a negative output for delivering a negative reference voltage; and
   c. means for generating a switching signal in response to the amplitude of said relatively high-frequency component rising above a positive reference voltage or falling below a negative reference voltage, said switching signal generating means having an input adapted to receive said relatively high-frequency component, a first reference voltage input connected to the positive output of said reference voltage generating means, a second reference voltage input connected to the negative output of said reference voltage generating means, and a switching signal output for delivering said switching signal, said switching signal output being connected to said switching signal input of said switching means.

* * * * *

Disclaimer 4,009,334.—*Richard Joseph Sypula*, Rochester, N.Y. VIDEO NOISE RE-
DUCTION CIRCUIT. Patent dated Feb. 22, 1977. Disclaimer filed
May 16, 1977, by the assignee, *Eastman Kodak Company*.
Hereby enters this disclaimer to the entire term of said patent.
[*Official Gazette July 12, 1977.*]